US010360380B2

(12) United States Patent
Maisel et al.

(10) Patent No.: US 10,360,380 B2
(45) Date of Patent: Jul. 23, 2019

(54) ADVANCED MALWARE CLASSIFICATION

(71) Applicant: Cylance Inc., Irvine, CA (US)

(72) Inventors: Matthew Maisel, Ann Arbor, MI (US);
Ryan Permeh, Irvine, CA (US);
Matthew Wolff, Laguna Niguel, CA (US); Gabriel Acevedo, Irvine, CA (US); Andrew Davis, Portland, OR (US); John Brock, Irvine, CA (US); Homer Strong, Irvine, CA (US);
Michael Wojnowicz, Irvine, CA (US); Kevin Beets, Irvine, CA (US)

(73) Assignee: Cylance Inc., Irvine, CA (US)

( * ) Notice: Subject to any disclaimer, the term of this patent is extended or adjusted under 35 U.S.C. 154(b) by 286 days.

(21) Appl. No.: 15/410,599

(22) Filed: Jan. 19, 2017

(65) Prior Publication Data
US 2018/0203998 A1 Jul. 19, 2018

(51) Int. Cl.
*H04L 29/06* (2006.01)
*G06F 21/56* (2013.01)
*G06N 7/00* (2006.01)
*G06N 20/00* (2019.01)

(52) U.S. Cl.
CPC ............ *G06F 21/565* (2013.01); *G06F 21/56* (2013.01); *G06F 21/563* (2013.01); *G06N 7/005* (2013.01); *G06N 20/00* (2019.01); *G06F 2221/033* (2013.01)

(58) Field of Classification Search
CPC ............... H04L 63/145; H04L 63/1441; H04L 63/1416
See application file for complete search history.

(56) References Cited

U.S. PATENT DOCUMENTS

| 7,340,776 | B2 * | 3/2008 | Zobel ................... G06F 21/577 713/188 |
| 2012/0210423 | A1 * | 8/2012 | Friedrichs ............. G06F 21/564 726/22 |
| 2013/0097706 | A1 * | 4/2013 | Titonis ................... G06F 21/56 726/24 |
| 2014/0304800 | A1 | 10/2014 | Morris et al. |

FOREIGN PATENT DOCUMENTS

WO 2016/182668 A1 11/2016

* cited by examiner

*Primary Examiner* — Jason K Gee
(74) *Attorney, Agent, or Firm* — Jones Day

(57) ABSTRACT

In one respect, there is provided a system for classifying malware. The system may include a data processor and a memory. The memory may include program code that provides operations when executed by the processor. The operations may include: providing, to a display, contextual information associated with a file to at least enable a classification of the file, when a malware classifier is unable to classify the file; receiving, in response to the providing of the contextual information, the classification of the file; and updating, based at least on the received classification of the file, the malware classifier to enable the malware classifier to classify the file. Methods and articles of manufacture, including computer program products, are also provided.

32 Claims, 11 Drawing Sheets

ADVANCED MALWARE CLASSIFICATION

TECHNICAL FIELD

The subject matter described herein relates generally to computer security and more specifically to the classification of malware.

BACKGROUND

Malware classification techniques typically rely on available knowledge to classify a file as malicious or benign. For instance, in anomaly-based detection, existing knowledge of normal, non-malicious behavior may be used to identify files that exhibit anomalous behavior. A file may be classified as malicious if the file exhibits any behavior that differs from what is known as normal behavior. By contrast, signature-based detection may rely on a repository of signatures (e.g., snippets of program code) that are known to be associated with one or more malicious files. Here, the presence of one or more signatures in a file may indicate that the file is malicious. The effectiveness of a malware classifier tends to be limited by the knowledge that is available to the malware classifier. As such, malware classifiers generally lack the knowledge to correctly classify new (e.g., zero-day) and/or uncommon malware.

SUMMARY

Systems, methods, and articles of manufacture, including computer program products, are provided for malware classification. In some example embodiments, there is provided a system that includes at least one processor and at least one memory. The at least one memory may include program code that provides operations when executed by the at least one processor. The operations may include: providing, to a display, contextual information associated with a file to at least enable a classification of the file, when a malware classifier is unable to classify the file; receiving, in response to the providing of the contextual information, the classification of the file; and updating, based at least on the received classification of the file, the malware classifier to enable the malware classifier to classify the file.

In some variations, one or more features disclosed herein including the following features can optionally be included in any feasible combination. The classification of the file may indicate that the file is a malicious file or a benign file. The malware classifier may be a machine learning model. The updating of the malware classifier may include training, based at least on the file and the classification of the file, the machine learning model. The malware classifier may be updated, based at least on the received classification of the file, to further enable the malware classifier to classify at least one other file that is identical or similar to the file.

In some variations, the contextual information may include a taxonomical classification of the file. The taxonomical classification may include a type of malware, a type of potentially unwanted program, and/or a type of trusted application.

In some variations, the contextual information may include one or more other files that are similar to the file, wherein the one or more other files being identified based at least on a distance between the file and one or more clusters, and the one or more clusters being generated by at least clustering the one or more other files. The one or more other files may be clustered based at least on one or more features associated with the one or more other files, the one or more features including a filepath, an instruction sequence, a string of characters, a string of binary digits, file size, file metadata, and/or file type.

In some variations, the contextual information may include one or more features of the file that contribute to a classification of the file. The one or more features may include an anomalous behavior, a deceptive behavior, a data loss capability, a data collection capability, and/or a destructive behavior exhibited by the file.

In some variations, the contextual information may include a measure of a prevalence of the file. The prevalence of the file may correspond to a frequency with which the malware classifier has encountered files having a same hash value as the file.

In some variations, the contextual information may include a measure of a prevalence of a feature present in the file. The prevalence of the feature may correspond to a frequency with which the malware classifier has encountered a same feature as the feature present in the file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

When attempting to classify a file, a malware classifier may rely on existing knowledge of, for example, normal (e.g., non-malicious) behavior, malware signatures, and/or the like. But the efforts to classify a file generally ignore contextual information associated with the file. That is, the malware classifier may classify the file as either malicious or benign without collecting and/or generating any additional information. For example, the malware classifier may classify a file as malicious without providing any further indications of the specific type of threat the malicious file poses (e.g., adware, hacking tool, toolbar, backdoor, infostealer, Trojan, worm) or a time, method, and location of detection. In instances where the malware classifier is unable to classify a file, this lack of contextual information may impede and/or slow subsequent manual classification of the file.

In some example embodiments, a cognition engine may be configured to generate and/or collect contextual information associated with one or more files. The cognition engine may extract contextual information associated with files that are successfully classified as malicious or benign. Alternately or additionally, the cognition engine may extract contextual information from files that cannot be successfully classified as malicious or benign. The contextual information may include, for example, specific threat classifications (e.g., virus, worm, Trojan, bot, dual use, or potentially unwanted program), malware functionalities, prevalence, entities targeted with the same or similar files, and/or the like.

In some example embodiments, contextual information may be used to facilitate and/or expedite manual classification of a file that cannot be successfully classified by a malware classifier. The contextual information may further be used to generate one or more updates for the malware classifier such that the malware classifier is able to successfully classify the same or similar files during subsequent encounters with the same or similar file.

Figure 1:
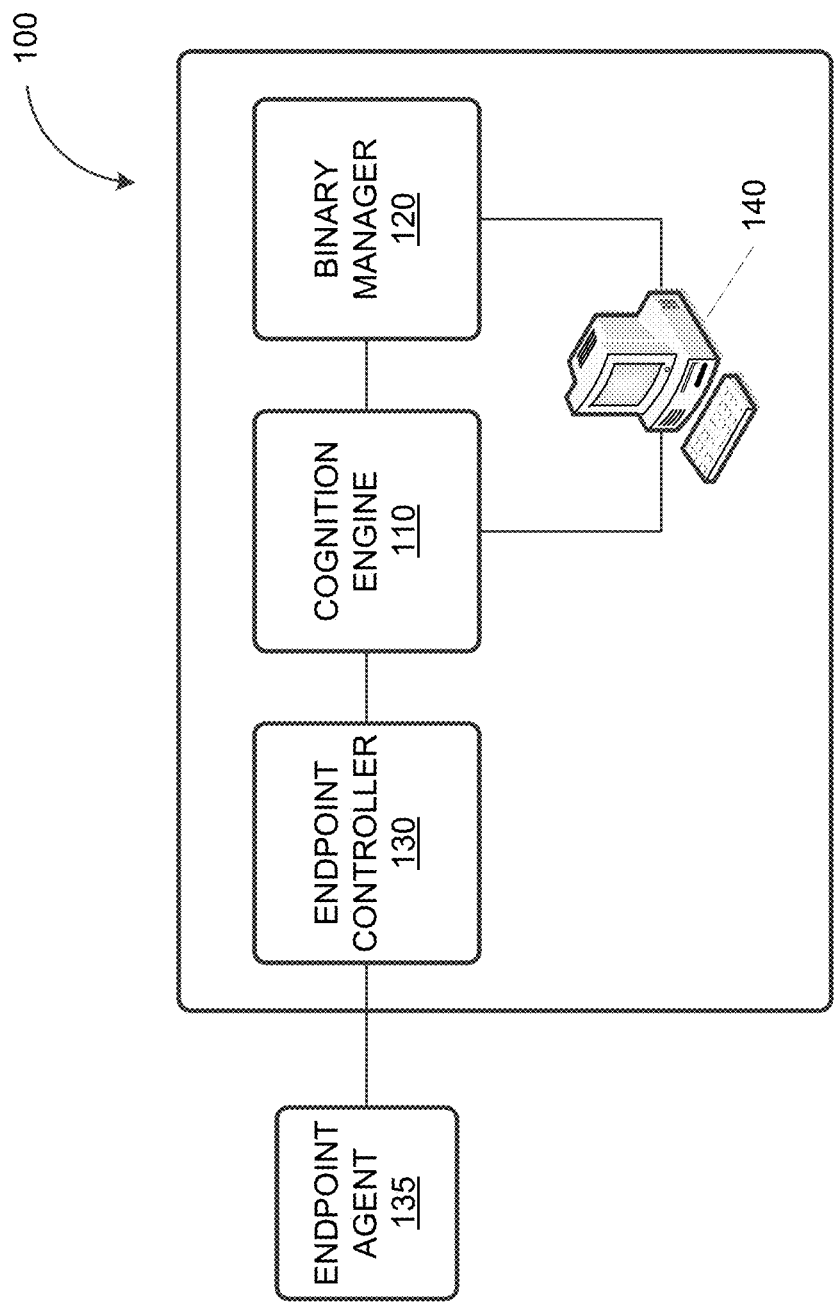
FIG. 1 depicts block diagram illustrating a malware classification system, in accordance with some example embodiments.

FIG. 1 depicts a block diagram illustrating a malware classification system 100, in accordance with some example embodiments. Referring to FIG. 1, the malware classification system 100 may include a cognition engine 110, a binary manager 120, and an endpoint controller 130. As shown in FIG. 1, the malware classification system 100 may communicate with one or more endpoint agents including, for example, an endpoint agent 135. In some example embodiments, the malware classification system 100 may be a cloud platform that may be accessed (e.g., by the endpoint agent 135) via a wired and/or wireless network (e.g., wide area network (WAN), local area network (LAN), the Internet). It should be appreciated that the malware classification system 100 may communicate with any number of endpoint agents without departing from the scope of the present disclosure.

In some example embodiments, the endpoint agent 135 may be deployed at an endpoint. The endpoint may include one or more a computing devices or machines including, for example, workstations, personal computers, tablet personal computers, smartphones, and/or the like. As such, the endpoint agent 135 may be a software application that may be downloaded and/or installed at the endpoint. The endpoint agent 135 may include the functionalities of a malware classifier configured to detect the presence of malware at the endpoint by at least classifying one or more files present at the endpoint as malicious or benign. The endpoint agent 135 may classify the one or more files based on a local knowledge base that includes, for example, normal behavior, malware signatures, and/or the like. The endpoint agent 135 may further be configured to send, to the malware classification system 100, event data relating to files that the endpoint agent 135 have classified and/or attempted to classify. For clarity and conciseness, the examples provided herein may refer to the endpoint agent 135 as being deployed at a computing device and scanning files thereon, it should be appreciated that the endpoint agent 135 may scan any form of data storage and/or transportation medium including for example, disks, network traffic, cloud-based storage without departing from the scope of the present disclosure.

According to some example embodiments, the endpoint agent 135 may generate, for each file, a classification (e.g., as malicious or benign). The classification for a file may be expressed as and/or associated with a confidence score indicating a likelihood and/or probability of the file having a certain classification. For example, the endpoint agent 135 may generate, for a file, a confidence score having a value in the range of [−1, 1]. The file may be associated with a confidence score of −0.59, which indicates a 59% likelihood and/or probability that the file is a malicious file. Alternately, the file may be associated with a confidence score of 0.15 indicating a 15% likelihood and/or probability that the file is a benign file. Thus, for each file, the endpoint agent 135 may send, to the malware classification system 100, event data that may include, for example, the file, a classification of the file (e.g., as malicious or benign) and/or a confidence score for the classification of the file.

The endpoint manager 130 may be configured to communicate with one or more endpoint agents including, for example, the endpoint agent 135. For instance, in some example embodiments, the endpoint manager 130 may receive, from the endpoint agent 135, event data that may relate to files that the endpoint agent 135 has classified and/or attempted to classify. In some example embodiments, the endpoint manager 130 may identify files that require further processing by the cognition engine 110. For example, the endpoint agent 130 may determine, based on a confidence score associated with the classification of a file, whether the file requires additional processing by the cognition engine 110. The file may require additional processing by the cognition engine 110 if the confidence score associated with the classification of the file does not exceed a threshold value. As such, the endpoint controller 130 may forward, to the cognition engine 110, the event data corresponding to the file.

According to some example embodiments, the cognition engine 110 may further process a file by at least generating, based on the event data associated with the file, various contextual information associated with the file. For example, contextual information associated with the file may include, for example, a time, location, and method used (e.g., by the endpoint agent 135) to classify the file. The contextual information may also include a prevalence of the file as well as entities (e.g., organizations, industries) that are targeted by and/or encounter the same or similar files. The contextual information associated with a file may further include a specific classification and/or sub-classification of the type of threat posed by the file. Alternately or additionally, the contextual information associated with the file may include one or more files and/or groups of files that may be similar to the file. The cognition engine 110 may further identify various features from the file (e.g., instruction sequences) that contributed to an initial classification (e.g., by the endpoint agent 135) of the file as malicious or benign.

In some example embodiments, files that require additional processing by the cognition engine 110 may be placed in a queue (e.g., by the endpoint controller 130). Files in the queue may be prioritized based on an age of the individual files. For instance, the cognition engine 110 may be configured to process older files ahead of more recent files, or vice versa. Alternately or additionally, the files in the queue may be prioritized based on a prevalence of the individual files. For example, the cognition engine 110 may prioritize files that are encountered more frequently and/or files that are encountered by a higher number of endpoint agents.

In some example embodiments, the cognition engine 110 can be further configured to prioritize files based on the time required to classify the individual files. For instance, the cognition engine 110 can apply one or more machine learning models that are trained based on training data that includes, for example, previously classified files and corresponding timestamps for when each file was first encountered and when each file was classified. The machine learning model may thus be trained to provide an estimate of the time required to manually classify a file. This estimate may correspond to an indirect measure of the complexity associated with manually classifying the file. Accordingly, the cognition engine 110 may be configured to prioritize files that require more time to classify and are therefore more complex. Alternately and/or additionally, the cognition engine 110 can be configured to prioritize files based on the occurrence of inconsistent classifications for the individual files. For example, the cognition engine 110 can be configured to identify and prioritize files that have been given different and/or conflicting classifications (e.g., by different malware classification systems).

In some example embodiments, the contextual information that is generated by the cognition engine 110 may be subsequently used to facilitate and/or expedite one or more other forms of classification including, for example, a manual classification of the file. For instance, a file may require manual classification when the confidence score associated a classification of the file generated at an endpoint (e.g., by the endpoint 135) do not exceed a threshold value. As such, the cognition engine 110 may be configured to provide the contextual information, through one or more application programming interfaces, to a client device 140. The contextual information may be provided via user interfaces (e.g., graphic user interfaces) at the client device 140 such that a user at the client device 140 is able to apply the contextual information to manually classify the corresponding file. Furthermore, the user at the client device 140 may provide, via the user interfaces at the client device 140, a manual classification of the file.

According to some example embodiments, the manual classification of a file as well the corresponding event data and contextual information may be used to update a global knowledge base managed by the binary manager 120. The global knowledge base may include knowledge of non-malicious behavior, malware signatures, and/or the like. Meanwhile, the manual classification of a file as well the corresponding event data and contextual information may capture data from instances where the current endpoint agent 135 was not able to successfully and/or correctly classify a file (e.g., false positives and/or false negatives). In some example embodiments, the binary manager 120 may be configured to generate, based on the updates to the global knowledge base, corresponding updates for one or more endpoint agents associated with the malware classification system 100 including, for example, the endpoint agent 135. For example, in order to classify files as malicious or benign, the endpoint agent 135 may apply one or more machine learning models including, for example, linear classifiers (e.g., linear discriminant analysis) and neural networks (e.g., convolutional neural networks, recurrent neural networks, and/or the like). Thus, the binary manager 120 may generate updates that enable the machine learning models to successfully classify the same or similar files during subsequent encounters with the same or similar file.

Figure 2:
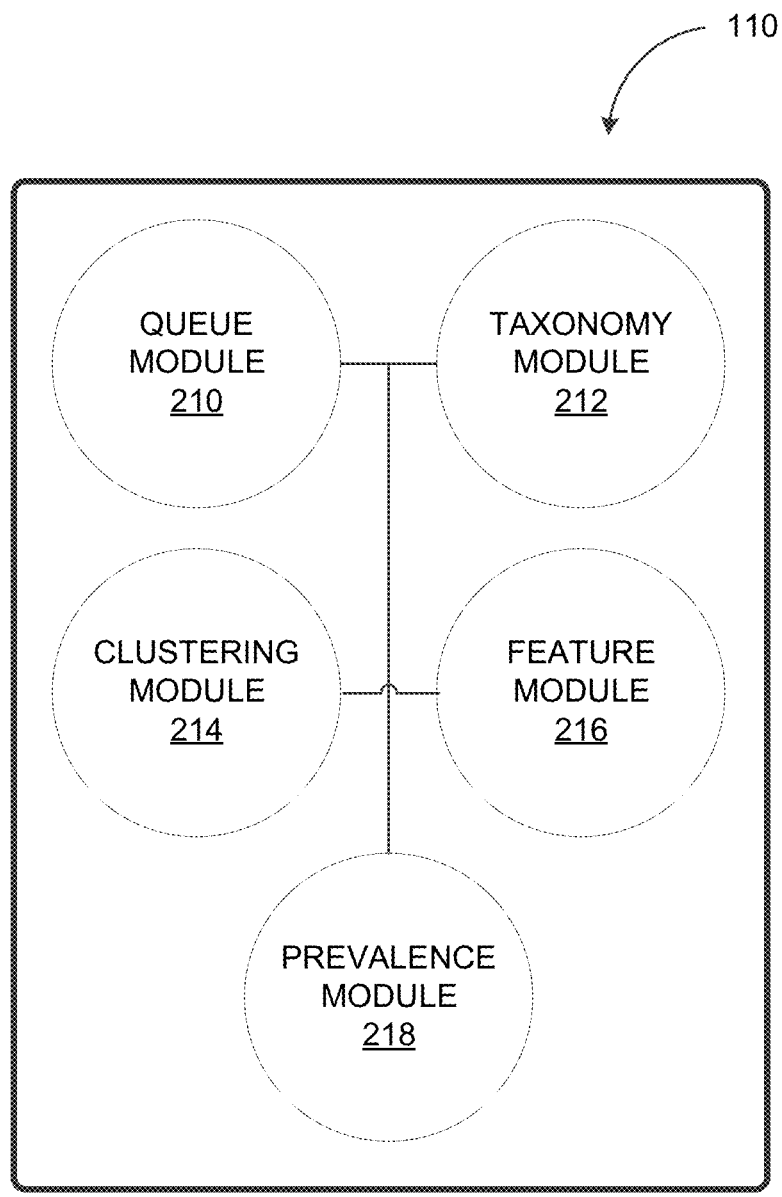
FIG. 2 depicts a block diagram illustrating a cognition engine, in accordance with some example embodiments.

FIG. 2 depicts a block diagram illustrating the cognition engine 110, in accordance with some example embodiments. Referring to FIG. 2, the cognition engine 110 may include a queue module 210, a taxonomy module 212, a clustering module 214, a feature module 216, and a prevalence module 218.

In some example embodiments, the queue module 210 may be configured to manage a queue of files that require processing by the cognition engine 110 (e.g., as determined by the endpoint controller 130). The queue module 210 may be configured to determine an order or priority of processing by the cognition engine 110. According to some example embodiments, the queue module 210 may be configured to prioritize the files in the queue based on factors that include, for example, an age of the individual files, a prevalence of the individual files, a time required to classify the individual files, and/or inconsistent classifications given to the individual files. It should be appreciated that the queue module 210 may be configured to prioritize files in the queue based on different factors.

The taxonomy module 212 may be configured to determine a specific classification for each file received at the cognition engine 110. As noted earlier, the endpoint agent 135 may classify a file as malicious or benign. Meanwhile, the taxonomy module 212 may determine the specific type of threat that the file poses. For example, the taxonomy module 212 may determine whether a file is malware, a potentially unwanted program (PUP), or a trusted application. The taxonomy module 212 may further determine sub-classifications for the file. For instance, the taxonomy module 212 may classify the file as a specific type of malware (e.g., backdoor, infostealer, Trojan, worm), potentially unwanted program (e.g., adware, hacking tool, toolbar), or trusted application (e.g., local application, cloud or web-based application).

In some example embodiments, the taxonomy module 212 may include a machine learning model (e.g., a multi-class neural network and/or the like) that is trained to predict a specific classification for a file (e.g., as a specific type of malware, potentially unwanted program, and/or trusted application). That is, the taxonomy module 212 may generate a more specific classification that supplements the general classification (e.g., malicious or benign) provided by the malware classification system 100. According to some example embodiments, the machine learning model may be trained based on a set of files that are known to be specific types of malware, potentially unwanted program, and/or trusted applications. For instance, the machine learning model may be trained using a set of files having manually designated labels, which can change dynamically over time. A trained machine learning model may be configured to output confidence scores indicating a likelihood and/or probability of the file being various types of malware, potentially unwanted program, and/or trusted application. Table 1 below shows the confidence scores that the taxonomy module 212 may generate for a file. The specific classification for the file may be the type of malware that is associated with the highest confidence score (e.g., Trojan).

TABLE 1

| CLASSIFICATION | CONFIDENCE SCORE |
|---|---|
| BACKDOOR | .21 |
| INFOSTEALER | .15 |
| TROJAN | .87 |
| WORM | .54 |
| ADWARE | .37 |
| HACKING TOOL | .08 |
| TOOLBAR | .44 |

In some example embodiments, the clustering module 214 may be configured to identify similar files by at least applying one or more clustering techniques including, for example, connectivity-clustering, centroid-based clustering, distribution-based clustering, and density-based clustering. The files may be clustered based on various features associated with the file including, for example, a size of the file, one or more strings (e.g., of characters and/or binary digits) included in the file, metadata associated with the file, a type of the file, and/or the like. According to some example embodiments, files having similar features may be grouped into the same cluster. The formation of one or more clusters may enable the clustering module 214 to identify files that are similar to one another.

In some example embodiments, the feature module 216 may be configured to identify features that have contributed to the classification of a file as malicious or benign (e.g., by the endpoint agent 135). In doing so, the feature module 216 may provide an explanation for the classification of the file as malicious or benign. According to some example embodiments, each of a plurality of features that is used in the classification of a file may be associated with a corresponding weight. The weighted sum of these features may correspond to a confidence indicating a likelihood and/or probability that the file is a malicious file or a benign file. To further illustrate, the likelihood P that a computer program may include malicious code can be expressed by the following equation (1):

$$P = w_1 + w_2 + \ldots + w_n \quad (1)$$

wherein the likelihood P can be a sum of the respective weights $w_1, w_2, \ldots w_n$ associated with each of the n number of features present in and/or absent from the computer program.

In some example embodiments, the weight that is associated with a feature may correspond to a degree to which the feature contributes to the classification of a file. For instance, features having relatively low weight values may contribute more towards a benign classification while features having relatively high weight values may contribute more towards a malicious classification. According to some example embodiments, the feature module 216 may be further configured to determine, for one or more features present in a file, a z-score that corresponds to a measure of unusualness. For instance, the z-score for a feature may correspond to a number of standard deviations the feature is away from the mean of all the features that are present in a file and/or a frequency with which the feature occurs. Thus, the z-score for a feature may be high when the feature exhibits a high degree of deviation from other features and/or occurs infrequently.

In some example embodiments, the features that can contribute to a file being classified as malicious may include anomalies exhibited by the file. These anomalies may be one or more inconsistent elements (e.g., structural elements) present in the file. For example, an anomaly may be an anachronism in which the timestamp indicating when a file was compiled is modified. That is, a compiled executable file is typically associated with a 4-byte value that represents a time and date for when the executable file was compiled. A malicious file can be associated with a modified timestamp that provides a false indication of when the file was compiled.

In some example embodiments, the features that can contribute to a file being classified as malicious can include data collection capabilities exhibited by the file. That is, a malicious file may include elements capable of collecting sensitive information. For example, a malicious file may interact with a credential provider and/or mimic a credential provider that collects login information (e.g., username and/or password). Alternately and/or additionally, the features that can contribute to a file being classified as malicious can include data loss capabilities, which may be associated with outgoing network connections, evidence of acting as a browser, or other network communications. For example, a malicious file may avoid running in a virtual machine or display different behaviors when running in a virtual machine in order to evade anti-malware measures that typically use virtual machines to run potentially malicious files.

In some example embodiments, the features that can contribute to a file being classified as malicious can include deceptive behaviors exhibited by the file. Deceptive behaviors may include, for example, hidden sections of program code, inclusion of program code configured to avoid detection, and/or mislabeled program code and/or metadata. For instance, a malicious file can be presented as a self-extracting archive (e.g., compressed file) in order to thwart typical anti-malware measures that are unable to classify archived files.

In some example embodiments, the features that can contribute to a file being classified as malicious can include destructive behaviors exhibited by the file. Destructive behaviors may be associated with an ability to delete system resources such as, for example, files, directories, and/or the like. For instance, a malicious file may be able to manipulate the registry of an operating system (e.g., Windows®). In doing so, the malicious file may be able to gain persistence, avoid detection, access system information, and/or the like.

In some example embodiments, the features that can contribute to a file being classified as malicious can further include an ability to establish persistence within a system (e.g., a system at which the endpoint agent 135 is deployed). For example, a malicious file may be able to register itself to run at system startup and/or when a user logs into a system.

In some example embodiments, the prevalence module 218 may be configured to determine the prevalence of one or more files. For instance, the prevalence module 218 may determine the prevalence of a file based on a hash value of the file, which may be generated by applying one or more hash algorithms (e.g., message digest algorithm) to at least a portion of the file. The prevalence of the file may correspond to a total number of times the same hash is encountered by the malware classification system 100 and/or by one or more specific endpoint agents (e.g., the endpoint agent 135). Alternately or additionally, the prevalence of the file may correspond to a frequency with which the same hash is encountered by the malware classification system 100 and/or by one or more specific endpoint agents (e.g., the endpoint agent 135).

In some example embodiments, the prevalence module 218 may also be configured to determine the prevalence of one or more file features. For example, the prevalence module 218 may determine a total number of times the same file feature is encountered by the malware classification system 100 and/or by one or more specific endpoint agents (e.g., the endpoint agent 135). The prevalence module 218 may also determine a frequency with which a certain file feature is encountered by the malware classification system 100 and/or by one or more specific endpoint agents (e.g., the endpoint agent 135).

Figure 3:
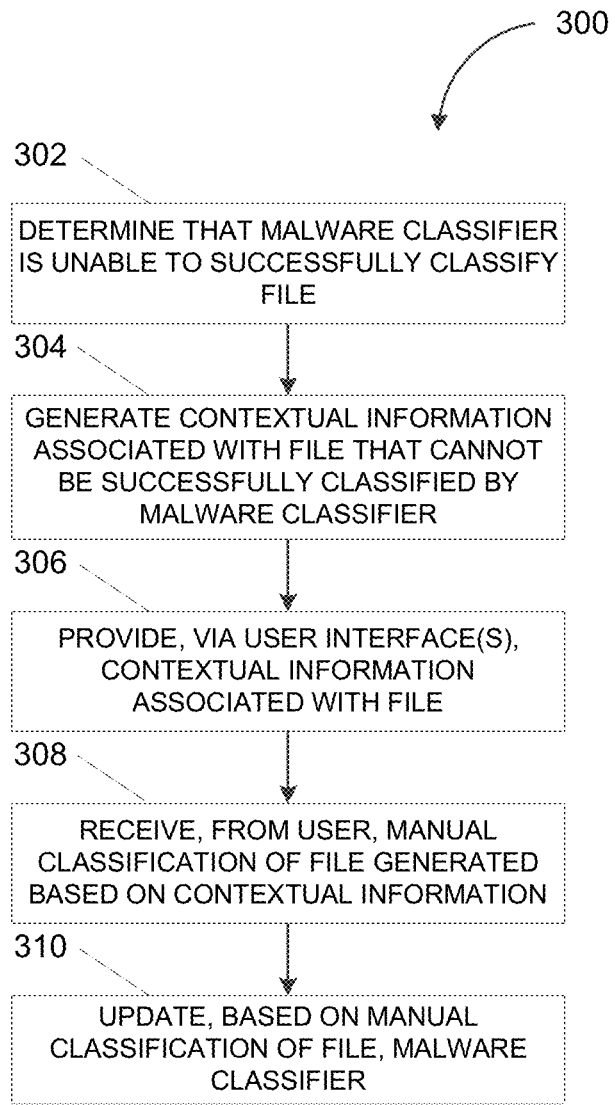
FIG. 3 depicts a flowchart illustrating a process for malware classification, in accordance with some example embodiments.

FIG. 3 depicts a flowchart illustrating a process 300 for malware classification, in accordance with some example embodiments. Referring to FIG. 1-3, the process 300 may be performed by the malware classification system 100.

The malware classification system 100 may determine that malware classifier is unable to successfully classify a file as malicious or benign (302). For example, the malware classification system 100 (e.g., the endpoint controller 130) may determine that the endpoint agent 135 cannot successfully classify a file as malicious or benign. In some example embodiments, the endpoint agent 135 may classify a file (e.g., as malicious or benign) and determine a confidence score indicative of a likelihood that the classification is correct. The malware classification system 100 may determine that the file is not successfully classified when the confidence score associated with the classification does not exceed a threshold value.

The malware classification system 100 may determine a plurality of contextual information associated with the file that cannot be successfully classified by the malware classifier (304). For example, the malware classification system 100 may determine contextual information that includes, for example, a taxonomy (e.g., classification and/or sub-classification) of the file, an age of the file, a prevalence of the file, similar files, and features that have been used by the endpoint agent 135 to classify the file.

The malware classification system 100 may provide, via a user interface, at least a portion of the contextual information associated with the file (306). The malware classification system 100 may further receive, from a user, a manual classification of the file that is generated based at least on the contextual information (308). For instance, the malware classification system 100 (e.g., the cognition engine 110) may provide contextual information (e.g., taxonomy, age, prevalence, features, similar files) to the client device 140. The contextual information may be provided via user interfaces (e.g., graphic user interfaces) at the client device 140 such that a user at the client device 140 is able to use the contextual information to generate a manual classification of the file.

The malware classification system 100 may update, based at least on the manual classification of the file, the malware classifier (310). For example, the malware classification system 100 (e.g., the binary manager 120) may update, based on the manual classification of the file, a global knowledge base. The malware classification system 100 (e.g., the binary manager 120) may further generate updates for the endpoint agent 135. For example, the endpoint agent 135 may apply one or more machine learning models (e.g., neural networks) in order to classify files as malicious or benign. Thus, the binary manager 120 may generate updates that enable the machine learning models to successfully classify the same or similar files during subsequent encounters with the same or similar file.

Figure 4:
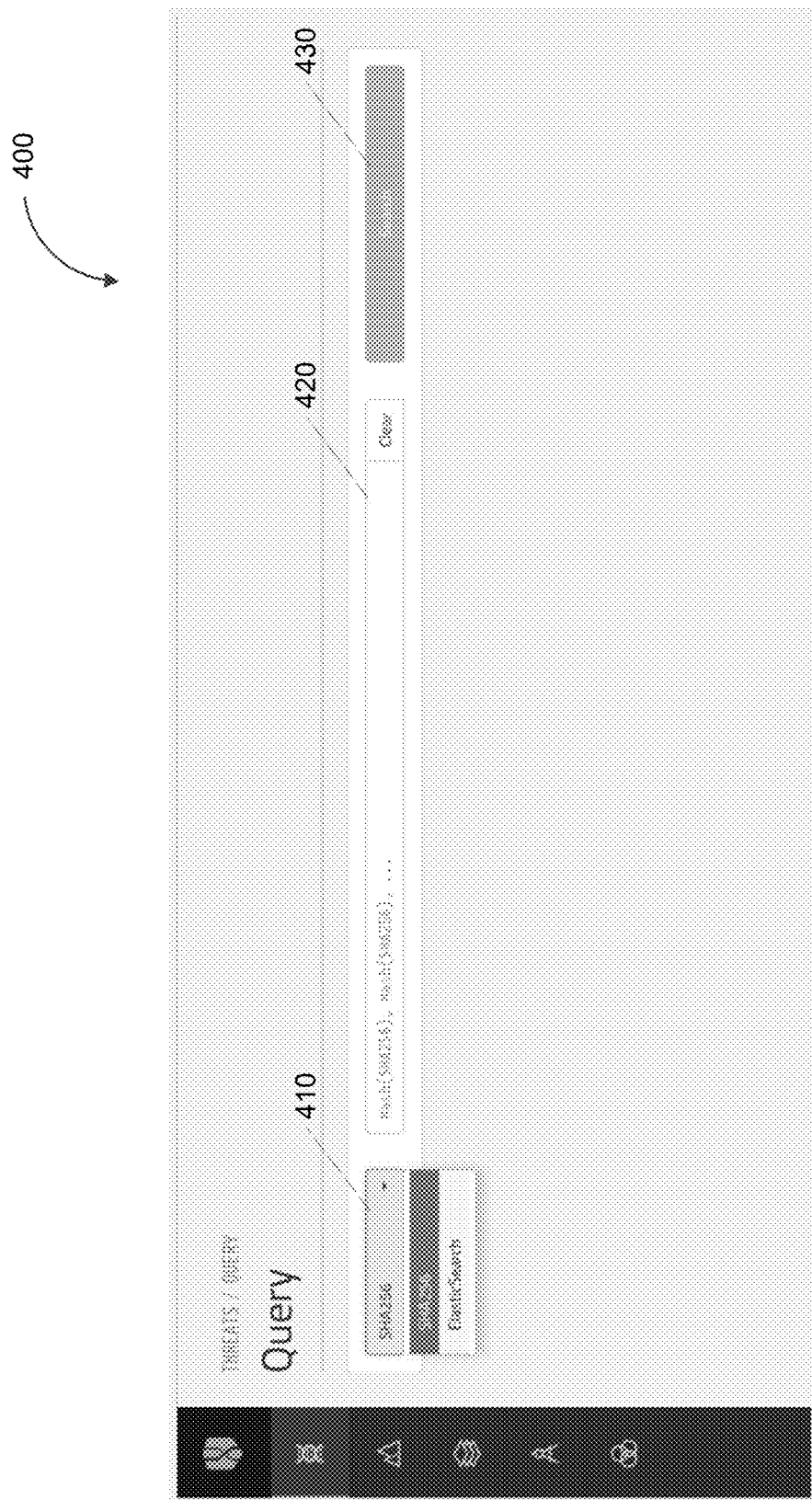
FIG. 4 depicts a user interface, in accordance with some example embodiments.

FIG. 4 depicts a user interface 400, in accordance with some example embodiments. Referring to FIGS. 1 and 4, the malware classification system 100 may generate the user interface 400 and provide the user interface 400 to the client device 140. As shown in FIG. 4, the user interface 400 may include one or more elements for inputting the parameters of a search for one or more files. For instance, the user interface 400 may include a dropdown menu 410, a text box 420, and a button 430. The dropdown menu 410 may enable a user to select a type of search that is based on the hash (e.g., secure hash algorithm (SHA) hash) of one or more files. Meanwhile, the text box 420 may enable the user to input the specific hash for the search and the button 430 may be selected to execute the search. It should be appreciated that the user interface 400 may enable a user to conduct a search for any file including, for example, files that have been classified (e.g., by the malware classification system 100), unclassified files, and/or all files that have been observed and/or quarantined.

Figure 5:
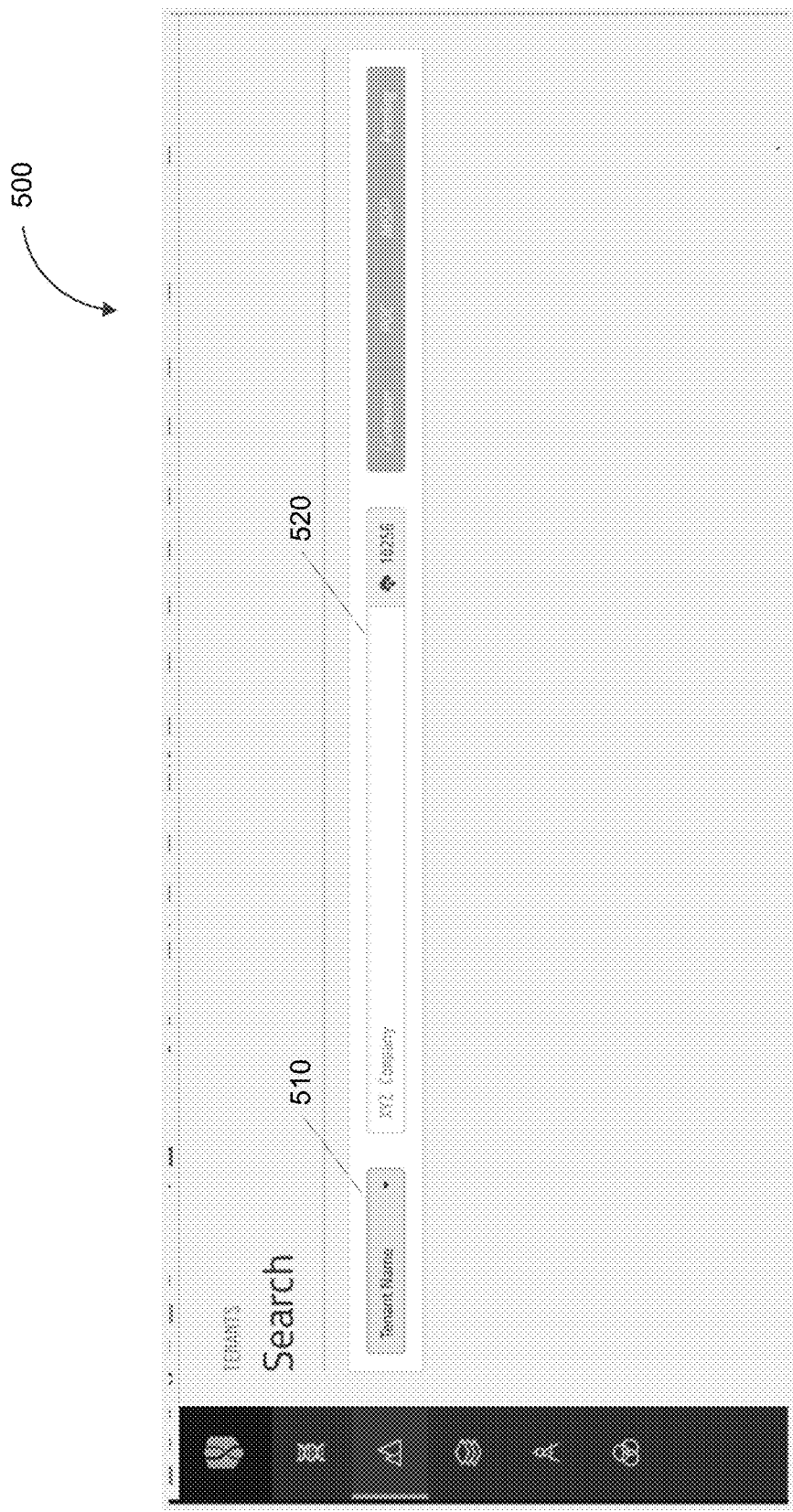
FIG. 5 depicts a user interface, in accordance with some example embodiments.

FIG. 5 depicts a user interface 500, in accordance with some example embodiments. Referring to FIGS. 1 and 5, the malware classification system 500 may generate the user interface 500 and provide the user interface 500 to the client device 140. As shown in FIG. 5, the user interface 500 may include one or more elements for inputting the parameters of a search for one or more files. In some example embodiments, the user interface 500 may enable a user search for files that are associated with a specific endpoint (e.g., tenant or user of the malware classification system 100). For instance, the user interface 500 may include a dropdown menu 510 and a text box 520. The dropdown menu 510 may enable a user to select a type of search that is based on the endpoint while the text box 520 may enable the user to input a specific endpoint for the search.

Figure 6:
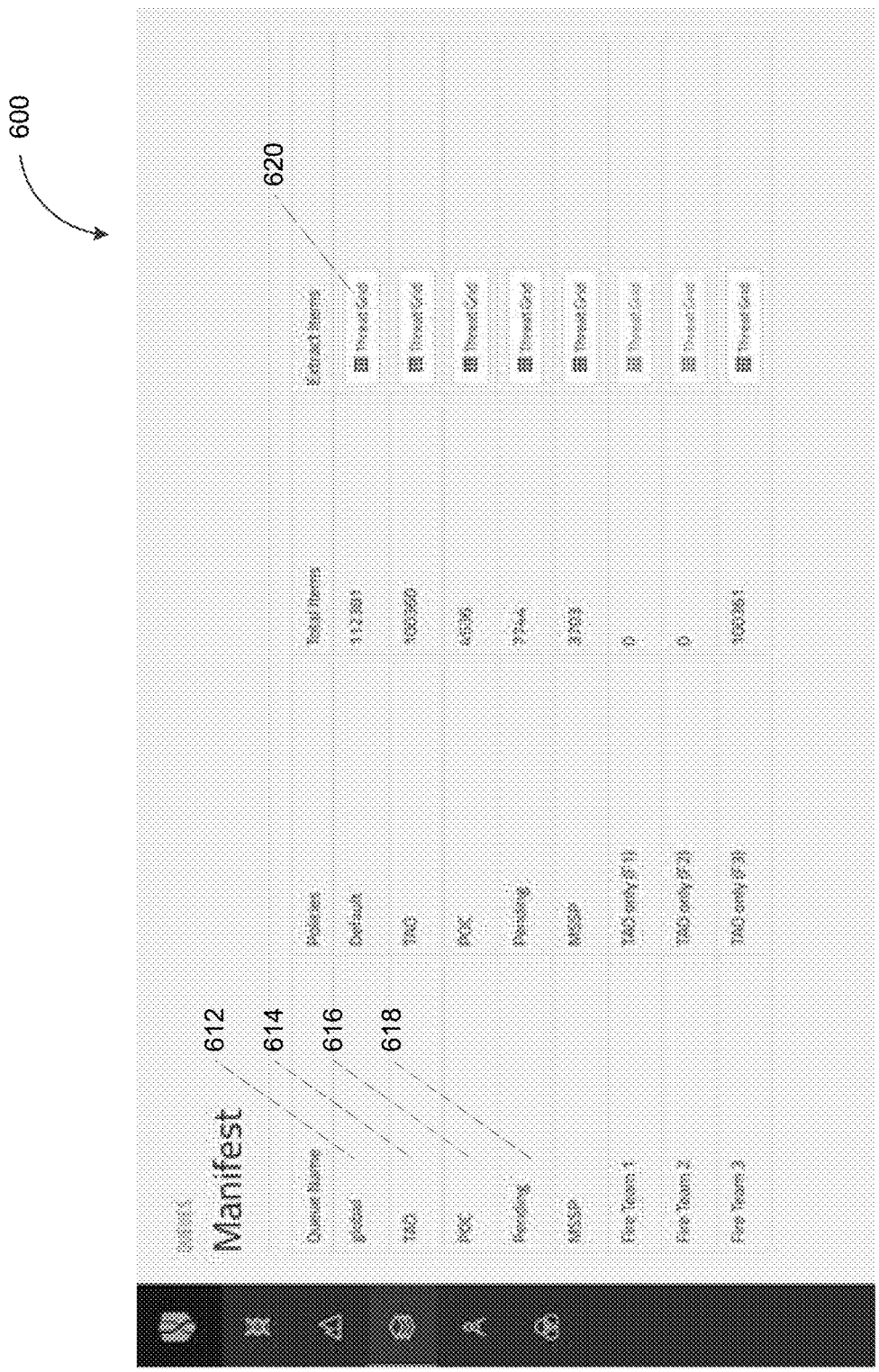
FIG. 6 depicts a user interface, in accordance with some example embodiments.

FIG. 6 depicts a user interface 600, in accordance with some example embodiments. Referring to FIGS. 1 and 6, the malware classification system 100 may generate the user interface 600 and provide the user interface 600 to the client device 140. In some example embodiments, the malware classification system 600 may generate the user interface 600 in response to a search (e.g., hash search and/or endpoint search). As shown in FIG. 6, the user interface 600 may provide a list 610 that includes a plurality of queues that each includes at least some of the files matching the search parameters input via the user interface 400 and/or the user interface 500. Thus, the files included in each of the queues shown in the list 610 may be files having a certain hash (e.g., as specified via the user interface 400) and/or files encountered at certain endpoints (e.g., as specified via the user interface 500).

According to some example embodiments, the results of a search may be organized into a plurality of queues such as, for example, a global queue 612, a TAO queue 614, a POC queue 616, and a pending queue 618. The global queue 612 may include all files encountered by the malware classification system 100. Meanwhile, the TAO queue 614, the POC queue 616, and the pending queue 618 may include each include a filtered subset of files, which may be generated by applying one or more filtering policies to the files in the global queue 612. For example, the pending queue 618 may include all files that are actively running and/or quarantined at one or more endpoints (e.g., the endpoint associated with the endpoint agent 135) and require classification by the malware classification system 100. In some example embodiments, each queue may be associated with a threat grid button. For example, the global queue 612 may be associated with a threat grid button 620. Activating the threat grid button associated with a queue may cause the generation of another user interface displaying the files that are included in that queue.

Figure 7:
FIG. 7 depicts a user interface, in accordance with some example embodiments.

FIG. 7 depicts a user interface 700, in accordance with some example embodiments. Referring to FIGS. 1 and 7, the malware classification system 100 may generate the user interface 700 and provide the user interface 700 to the client device 140. In some example embodiments, the malware classification system 100 may generate the user interface 700 in response to the activation of a threat grid button in the user interface 600. As shown in FIG. 7, the user interface 700 may display all the files that are included in a queue (e.g., the POC queue 616 shown in the user interface 600). The user interface 700 may further display data associated with each file including, for example, a classification, hash value, priority, and count.

Figure 8:
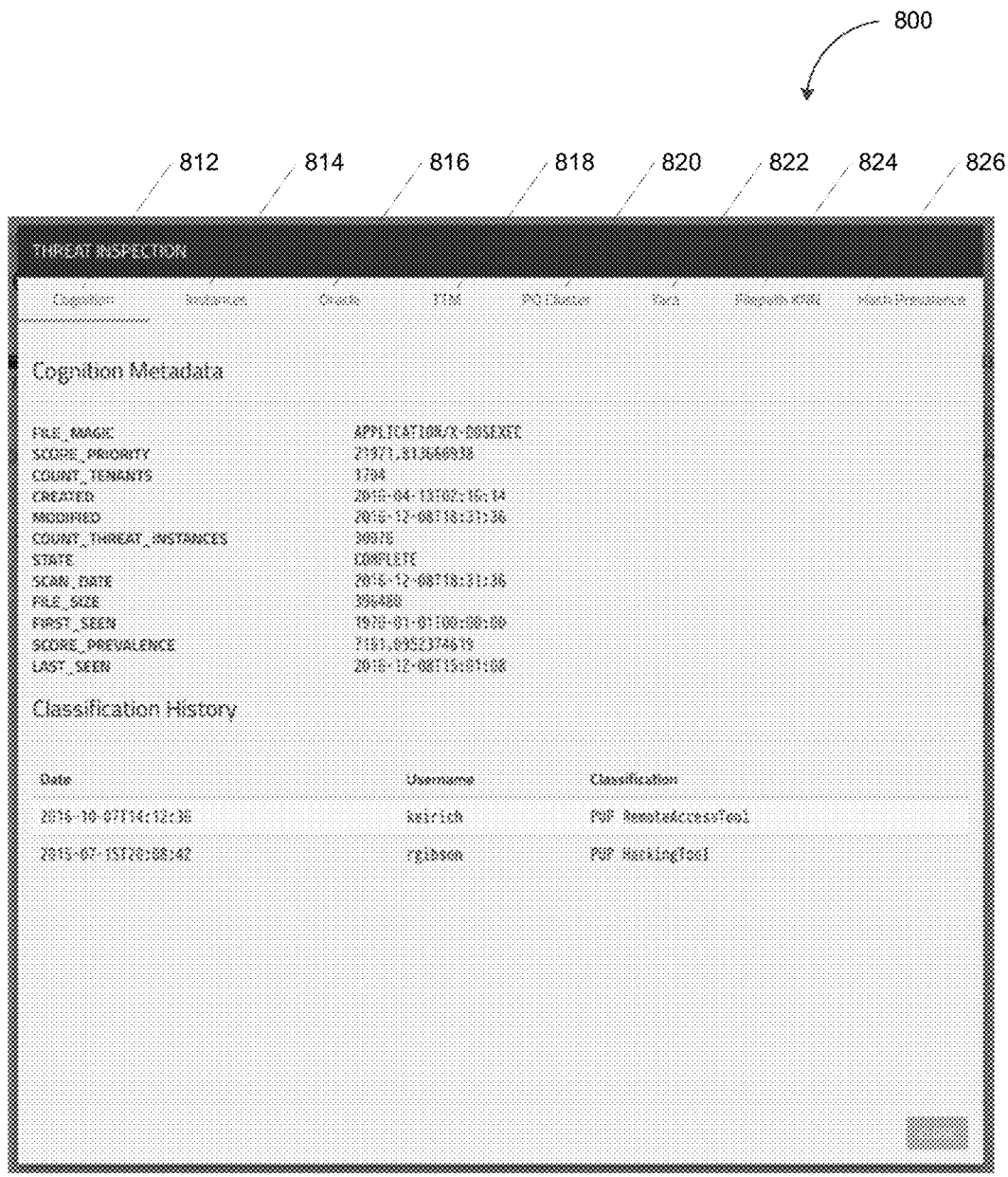
FIG. 8 depicts a user interface, in accordance with some example embodiments.

FIG. 8 depicts a user interface 800, in accordance with some example embodiments. Referring to FIGS. 1 and 8, the malware classification system 100 may generate the user interface 800 and provide the user interface 800 to the client device 140. The user interface 800 may be configured to provide a plurality of contextual information associated with a particular file. As shown in FIG. 8, the user interface 800 may include a plurality of tabs including, for example, a metadata tab 812, an instances tab 814, an oracle tab 816, a feature tab 818, a cluster tab 820, a signature tab 822, a filepath nearest neighbor tab 824, and a hash prevalence tab 826. Selecting one of the plurality of tabs shown in the user interface 800 may cause the user interface 800 to display a corresponding type of contextual information for a particular file. For example, selecting the oracle tab 816 may cause the user interface 800 to display a classification for a file including, for example, the confidence score indicating a likelihood and/or probability that the file has that particular classification. Selecting the feature tab 818 may cause the user interface 800 to display one or more features that have contributed to the classification of a file. Meanwhile, selecting the cluster tab 820 may cause the user interface 800 to display a result of applying one or more clustering techniques to identify similar files.

Figure 9:
FIG. 9 depicts a user interface, in accordance with some example embodiments.

FIG. 9 depicts a user interface 900, in accordance with some example embodiments. Referring to FIGS. 1 and 9, the malware classification system 100 may generate the user interface 900 and provide the user interface 900 to the client device 140. In some example embodiments, the malware classification system 100 may generate the user interface 900 in response to a selection of the instances tab 814 from the user interface 800. The user interface 900 may display instances of a file that are observed across all endpoints.

Figure 10:
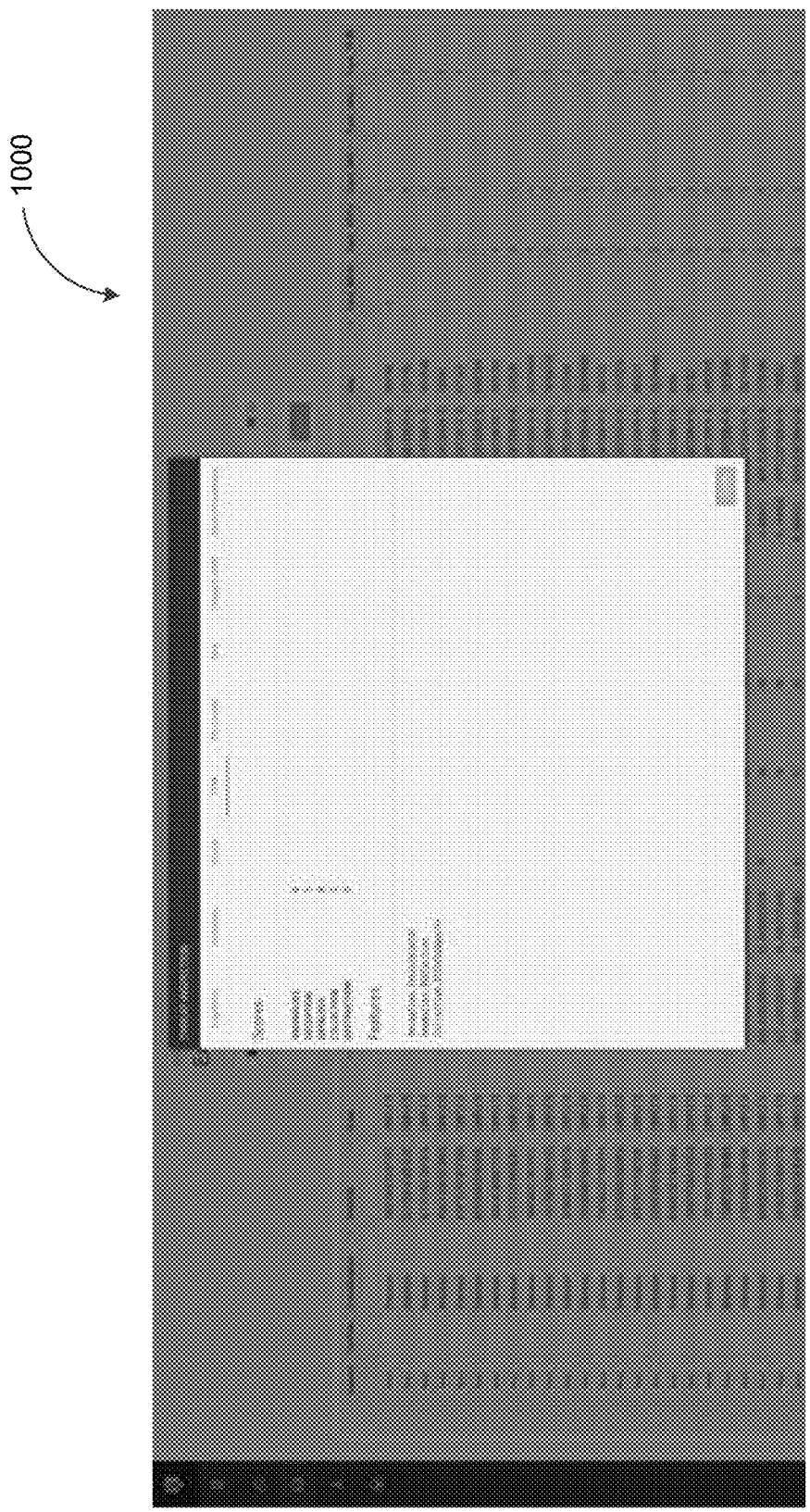
FIG. 10 depicts a user interface, in accordance with some example embodiments.

FIG. 10 depicts a user interface 1000, in accordance with some example embodiments. Referring to FIGS. 1 and 4, the malware classification system 100 may generate the user interface 1000 and provide the user interface 1000 to the client device 140. In some example embodiments, the malware classification system 100 may generate the user interface 1000 in response to a selection of the feature tab 818 from the user interface 800. The user interface 1000 may display one or more features from a file that contributes to the file being classified as malicious or benign. For instance, the user interface 1000 may show features including, for example, anomalies, deceptive behaviors, destructive behaviors, data loss capabilities, and data collection capabilities.

Figure 11:
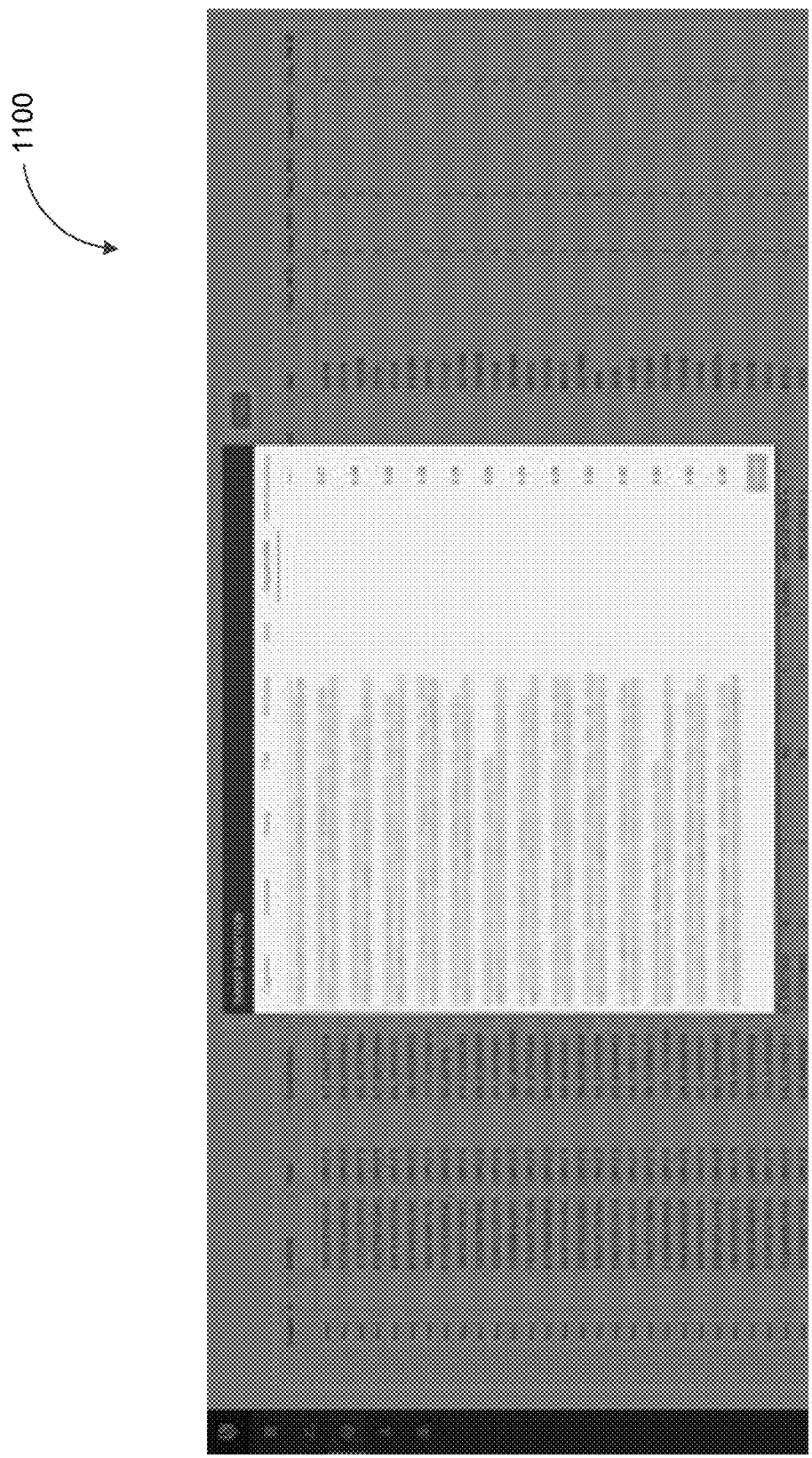
FIG. 11 depicts a user interface, in accordance with some example embodiments.

FIG. 11 depicts a user interface 1100, in accordance with some example embodiments. Referring to FIGS. 1 and 4, the malware classification system 100 may generate the user interface 1100 and provide the user interface 1100 to the client device 140. In some example embodiments, the malware classification system 100 may generate the user interface 1100 in response to a selection of the filepath nearest neighbor tab 824 from the user interface 800. As shown in FIG. 11, the user interface 1100 may displays files having the same and/or similar filepaths. As used herein, the filepath of a file may include the directory and/or the name associated with the file. The files shown in the user interface 1100 may be sorted based on the distance relative to a centroid of a cluster of files that have been clustered based on the files' respective filepaths.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital Mill image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
   at least one processor; and
   at least one memory including program code which when executed by the at least one processor provides operations comprising:
   providing, to a display, contextual information associated with a file to at least enable a classification of the file and an estimated amount of time required to classify the file, when a malware classifier is unable to classify the file, the estimated amount of time being determined by a machine learning model trained based on training data comprising previously classified files and corresponding timestamps for when each such file was first encountered and when each such file was classified;
   receiving, in response to the providing of the contextual information, the classification of the file; and
   updating, based at least on the received classification of the file, the malware classifier to enable the malware classifier to classify the file.

2. The system of claim 1, wherein the classification of the file indicates that the file is a malicious file or a benign file.

3. The system of claim 1, wherein the malware classifier comprises a machine learning model.

4. The system of claim 3, wherein the updating of the malware classifier comprises training, based at least on the file and the classification of the file, the machine learning model.

5. The system of claim 1, wherein the malware classifier is updated, based at least on the received classification of the file, to further enable the malware classifier to classify at least one other file that is identical or similar to the file.

6. The system of claim 1, wherein the contextual information includes a taxonomical classification of the file.

7. The system of claim 6, wherein the taxonomical classification comprises a type of malware, a type of potentially unwanted program, and/or a type of trusted application.

8. The system of claim 1, wherein the contextual information includes one or more other files that are similar to the file, wherein the one or more other files being identified based at least on a distance between the file and one or more clusters, and the one or more clusters being generated by at least clustering the one or more other files.

9. The system of claim 8, wherein the one or more other files are clustered based at least on one or more features associated with the one or more other files, the one or more features including a filepath, an instruction sequence, a string of characters, a string of binary digits, file size, file metadata, and/or file type.

10. The system of claim 1, wherein the contextual information includes one or more features of the file that contribute to a classification of the file.

11. The system of claim 10, wherein the one or more features include an anomalous behavior, a deceptive behavior, a data loss capability, a data collection capability, and/or a destructive behavior exhibited by the file.

12. The system of claim 1, wherein the contextual information includes a measure of a prevalence of the file.

13. The system of claim 12, wherein the prevalence of the file corresponds to a frequency with which the malware classifier has encountered files having a same hash value as the file.

14. The system of claim 1, wherein the contextual information includes a measure of a prevalence of a feature present in the file.

15. The system of claim 14, wherein the prevalence of the feature corresponds to a frequency with which the malware classifier has encountered a same feature as the feature present in the file.

16. A method, comprising:
providing, to a display, contextual information associated with a file to at least enable a classification of the file and an estimated amount of time required to classify the file, when a malware classifier is unable to classify the file, the estimated amount of time being determined by a machine learning model trained based on training data comprising previously classified files and corresponding timestamps for when each such file was first encountered and when each such file was classified;
receiving, in response to the providing of the contextual information, the classification of the file; and
updating, based at least on the received classification of the file, the malware classifier to enable the malware classifier to classify the file.

17. The method of claim 16, wherein the classification of the file indicates that the file is a malicious file or a benign file.

18. The method of claim 16, wherein the malware classifier comprises a machine learning model.

19. The method of claim 18, wherein the updating of the malware classifier comprises training, based at least on the file and the classification of the file, the machine learning model.

20. The method of claim 16, wherein the malware classifier is updated, based at least on the received classification of the file, to further enable the malware classifier to classify at least one other file that is identical or similar to the file.

21. The method of claim 16 wherein the contextual information includes a taxonomical classification of the file.

22. The method of claim 21, wherein the taxonomical classification comprises a type of malware, a type of potentially unwanted program, and/or a type of trusted application.

23. The method of claim 16, wherein the contextual information includes one or more other files that are similar to the file, the one or more other files being identified based at least on a distance between the file and one or more clusters, and the one or more clusters being generated by at least clustering the one or more other files.

24. The method of claim 23, wherein the one or more other files are clustered based at least on one or more features associated with the one or more other files, the one or more features including a filepath, an instruction sequence, a string of characters, a string of binary digits, file size, file metadata, and/or file type.

25. The method of claim 16, wherein the contextual information includes one or more features of the file that contribute to a classification of the file.

26. The method of claim 25, wherein the one or more features include an anomalous behavior, a deceptive behavior, a data loss capability, a data collection capability, and/or a destructive behavior exhibited by the file.

27. The method of claim 16, wherein the contextual information includes a measure of a prevalence of the file.

28. The method of claim 27, wherein the prevalence of the file corresponds to a frequency with which the malware classifier has encountered files having a same hash value as the file.

29. The method of claim 16, wherein the contextual information includes a measure of a prevalence of a feature present in the file.

30. The method of claim 29, wherein the prevalence of the feature corresponds to a frequency with which the malware classifier has encountered a same feature as the feature present in the file.

31. A non-transitory computer-readable storage medium including program code which when executed by at least one processor causes operations comprising:
providing, to a display, contextual information associated with a file to at least enable a classification of the file and an estimated amount of time required to classify the file, when a malware classifier is unable to classify the file, the estimated amount of time being determined by a machine learning model trained based on training data comprising previously classified files and corresponding timestamps for when each such file was first encountered and when each such file was classified;
receiving, in response to the providing of the contextual information, the classification of the file; and
updating, based at least on the received classification of the file, the malware classifier to enable the malware classifier to classify the file.

32. An apparatus, comprising:
means for providing, to a display, contextual information associated with a file to at least enable a classification of the file and an estimated amount of time required to classify the file, when a malware classifier is unable to classify the file, the estimated amount of time being determined by a machine learning model trained based on training data comprising previously classified files and corresponding timestamps for when each such file was first encountered and when each such file was classified;
means for receiving, in response to the providing of the contextual information, the classification of the file; and
means for updating, based at least on the received classification of the file, the malware classifier to enable the malware classifier to classify the file.

* * * * *